(12) United States Patent
Yamada

(10) Patent No.: US 11,206,521 B2
(45) Date of Patent: *Dec. 21, 2021

(54) SELECTIVE PAIRING OF WIRELESS DEVICES USING SHARED KEYS

(71) Applicant: VitaNet Japan, Inc., Tokyo (JP)

(72) Inventor: Takeo Yamada, Tokyo (JP)

(73) Assignee: VitaNet Japan, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,016

(22) Filed: Nov. 16, 2018

(65) Prior Publication Data

US 2019/0090115 A1 Mar. 21, 2019

Related U.S. Application Data

(63) Continuation of application No. 14/992,642, filed on Jan. 11, 2016, now Pat. No. 10,136,246.

(Continued)

(51) Int. Cl.
*H04W 4/80* (2018.01)
*H04W 12/06* (2021.01)
(Continued)

(52) U.S. Cl.
CPC .............. *H04W 4/80* (2018.02); *H04W 12/04* (2013.01); *H04W 12/06* (2013.01); *H04W 12/08* (2013.01); *H04W 12/50* (2021.01); *H04W 84/18* (2013.01)

(58) Field of Classification Search
CPC ....... H04W 12/06; H04W 4/80; H04W 12/04; H04W 12/08; H04W 12/00503; H04W 12/00522; H04W 12/02; H04W 12/10; H04W 84/18; H04W 84/12; H04W 88/06; H04W 8/005; H04W 12/0023; H04W 12/003; H04W 4/029; H04W 4/06; H04W 76/10; H04W 76/14; G07C 9/00571;
(Continued)

(56) References Cited

U.S. PATENT DOCUMENTS 7,933,412 B2 * 4/2011 Kugumiya .......... H04L 63/0428
380/258
8,687,554 B2 4/2014 Simons et al.
(Continued)

FOREIGN PATENT DOCUMENTS

CN 203950423 U 11/2014
CN 203970374 U 12/2014
(Continued)

OTHER PUBLICATIONS

Dbpower Oled Usb Bluetooth 4.0 Sport Health Smart Wireless Activity.
(Continued)

*Primary Examiner* — Golam Sorowar
(74) *Attorney, Agent, or Firm* — Mintz Levin Cohn Ferris Glovsky and Popeo, P.C.

(57) ABSTRACT

A system, a method, and a computer program product for selective pairing of wireless devices are provided. A pairing device scans for an advertising packet. The pairing device checks each scanned advertising packet for a shared key. The pairing device responds to the scanned advertising packet only when the advertising packet contains the shared key.

38 Claims, 11 Drawing Sheets

Related U.S. Application Data

(60) Provisional application No. 62/194,939, filed on Jul. 21, 2015.

(51) Int. Cl.
*H04W 12/08* (2021.01)
*H04W 12/00* (2021.01)
*H04W 12/04* (2021.01)
*H04W 84/18* (2009.01)
*H04W 12/50* (2021.01)

(58) Field of Classification Search
CPC ............ G07C 9/00309; G07C 9/00904; G07C 2009/00412; G07C 2009/00793; G07C 2009/00769; G07C 9/00007; G07C 9/00111; G07C 2209/64; G07C 2009/00825; G07C 9/00817; G07C 2009/00404; G07C 2009/00841; G07C 2009/00865; G07C 2209/08; H04L 2209/80; H04L 63/0435; H04L 63/0492; H04L 63/061; H04L 63/08; H04L 63/0876; H04L 63/0853; H04L 9/30; H04L 63/0428; H04L 63/126; H04L 9/14; H04L 9/321; H04L 2463/082; H04L 61/35; H04L 63/0442; H04L 63/045; H04L 63/0464; H04L 63/0807

See application file for complete search history.

(56) References Cited

U.S. PATENT DOCUMENTS

| | | | |
|---|---|---|---|
| 8,702,430 | B2 | 4/2014 | Dibenedetto et al. |
| 8,849,202 | B2 | 9/2014 | Linde et al. |
| 8,913,748 | B2 | 12/2014 | Ho et al. |
| 8,935,123 | B2 | 1/2015 | Yuen et al. |
| 8,943,187 | B1 | 1/2015 | Saylor |
| 9,032,501 | B1 | 5/2015 | Martin et al. |
| 9,197,414 | B1* | 11/2015 | Martin ................ H04W 12/003 |
| 9,365,188 | B1 | 6/2016 | Penilla et al. |
| 2007/0192832 | A1 | 8/2007 | Qi et al. |
| 2008/0160914 | A1 | 7/2008 | McRae et al. |
| 2011/0022916 | A1 | 1/2011 | Desai et al. |
| 2011/0319020 | A1* | 12/2011 | Desai ..................... H04W 4/80 455/41.2 |
| 2012/0068847 | A1 | 3/2012 | Pirzada |
| 2012/0302169 | A1 | 11/2012 | Lin et al. |
| 2013/0127636 | A1 | 5/2013 | Aryanpur et al. |
| 2013/0212661 | A1 | 8/2013 | Neafsey et al. |
| 2013/0290696 | A1 | 10/2013 | Broustis et al. |
| 2013/0317837 | A1 | 11/2013 | Ballantyne et al. |
| 2013/0342314 | A1 | 12/2013 | Chen et al. |
| 2014/0051941 | A1 | 2/2014 | Messerschmidt |
| 2014/0055243 | A1 | 2/2014 | Kerai |
| 2014/0094198 | A1 | 4/2014 | Heo et al. |
| 2014/0179233 | A1 | 6/2014 | Kang et al. |
| 2014/0181955 | A1 | 6/2014 | Rosati |
| 2014/0235171 | A1 | 8/2014 | Molettiere et al. |
| 2014/0275881 | A1 | 9/2014 | Lamego et al. |
| 2014/0335844 | A1 | 11/2014 | Kang et al. |
| 2014/0378057 | A1 | 12/2014 | Ramon et al. |
| 2015/0049871 | A1* | 2/2015 | Xie ........................ H04W 12/08 380/270 |
| 2015/0099467 | A1 | 4/2015 | Kang |
| 2015/0199863 | A1 | 7/2015 | Scoggins et al. |
| 2015/0207626 | A1 | 7/2015 | Neftel et al. |
| 2015/0221152 | A1 | 8/2015 | Andersen |
| 2015/0279130 | A1 | 10/2015 | Robertson et al. |
| 2015/0319674 | A1* | 11/2015 | Hughes ................. H04W 8/005 455/41.2 |
| 2015/0347738 | A1* | 12/2015 | Ulrich ..................... G06F 21/35 726/17 |
| 2015/0371026 | A1* | 12/2015 | Gnanasekaran ........ G06F 21/35 726/7 |
| 2016/0036788 | A1 | 2/2016 | Conrad et al. |
| 2016/0100311 | A1* | 4/2016 | Kumar .................... H04W 4/80 726/7 |
| 2016/0203661 | A1 | 7/2016 | Pudar et al. |

FOREIGN PATENT DOCUMENTS

| | | | |
|---|---|---|---|
| GB | 2514623 | A | 12/2014 |
| JP | 2005-204123 | A | 7/2005 |
| WO | WO-2011/010181 | A1 | 1/2011 |
| WO | WO-2013173349 | A2 | 11/2013 |
| WO | WO-2014008658 | A1 | 1/2014 |
| WO | WO-2014036955 | A1 | 3/2014 |
| WO | WO-2014076527 | A1 | 5/2014 |
| WO | WO-2014087192 | A1 | 6/2014 |
| WO | WO-2014110548 | A1 | 7/2014 |
| WO | WO-2015010289 | A1 | 1/2015 |

OTHER PUBLICATIONS

Intro to BLE with ARMmBed.
Sports Health Smart Wristband Band.
International Search Report and Written Opinion, PCT/IB2016/001063, dated Oct. 2016.

* cited by examiner

SELECTIVE PAIRING OF WIRELESS DEVICES USING SHARED KEYS

CROSS-REFERENCE

The present application is a continuation of and claims priority to U.S. patent application Ser. No. 14/992,642 to Takeo Yamada, filed on Jan. 11, 2016, now U.S. Pat. No. 10,136,246, issued on Nov. 20, 2018, and entitled "Selective Pairing of Wireless Devices Using Shared Keys", which claims priority to U.S. Provisional Patent Application No. 62/194,939, filed on Jul. 21, 2015, and incorporates their disclosures herein by reference in their entireties.

TECHNICAL FIELD

In some implementations, the subject matter described herein generally relates to communication systems, and, in particular, to selective pairing of wireless devices.

BACKGROUND

Modern telecommunications systems serve a vast number of devices, which can include wireless telephones, smartphones, tablet computers, personal computers, personal digital assistants, and/or other devices. Typically, these devices communicate with one another through various networks that can include base stations, wireless access points, servers, etc. To communicate with one another, the devices typically send and/or receive data packets containing information, e.g., emails, hypertext transfer protocol ("HTTP") data, message, etc. A data packet includes control information and user data, i.e., a payload. Control information provides data for delivering the payload (e.g., source and destination network addresses, error detection codes, sequencing information, etc) and is found in packet headers and trailers.

The data packets can be used to carry advertising information for a particular product, where various user devices can generate and broadcast such packets over a communication network. When a device broadcasts advertising packets, other devices can determine the types of products that may be found in the vicinity of the devices. While it may be difficult to intercept data traffic containing such data packets, knowing the types of products that may be available in the vicinity of the devices can undesirably reveal personal information. This can lead to a number of privacy and security concerns. For example, one such concern relates to recording advertising packets from a cellular telephone that may be meant for another device. This can lead to use of the advertising packets for receiving responses from the device, thereby resulting in a variety of security issues. Further, in some environments, such as hospitals, clinics, and/or other public places, multiple BLUETOOTH® Low Energy ("BLE") devices can be found in a relatively small area. As such, communication devices (e.g., cellular telephones, smartphones, tablets, etc.) can be provided with an ability to select one or more of these BLE devices for connection purposes. Some connections can be unsecured, thereby exposing the connection and the connecting device to intruders and security breaches. Thus, there is a need to provide for a way to manage connections to BLE devices without sacrificing connection security and speed of the connection.

SUMMARY

In some implementations, the current subject matter relates to a computer-implemented method for selective pairing of wireless devices. The method can include scanning by a pairing device, for an advertising packet, checking, by the pairing device, each scanned advertising packet for a shared key, and responding, by the pairing device, to the scanned advertising packet only when the advertising packet contains the shared key.

In some implementations, the current subject matter can include one or more of the following optional features. The advertising packet can transmitted by a communication device. The shared key can be in the same bit/byte form between the pairing device and the communication device. The advertising packet can be transmitted via BLUETOOTH® technology. The shared key can be a global shared key. The shared key can be a user-specific shared key associated with a particular user.

In some implementations, the method can also include scanning, by the pairing device, for a plurality of advertising packets, each advertising packet in the plurality of advertising packets containing a portion of the shared key, checking, by the pairing device, each scanned advertising packet for the respective portion of the shared key, and responding, by the pairing device, to the plurality of scanned advertising packet only when the entire shared key is found.

In some implementations, the method can also include confirming, by the pairing device, that the advertising packet contains the shared key that the pairing device is scanning for, and authorizing, by the pairing device, a user based on the confirmed shared key.

In some implementations, the responding can include transmitting one or more of data attributes, name, serial number, MAC address to a communication device or a server. The advertising packet can be encrypted. The advertising packet can include the shared key and a text added to the shared key before the shared key and the added text are encrypted. The text can be varied for each pairing with the pairing device.

Computer program products are also described that comprise non-transitory computer readable media storing instructions, which when executed one or more data processor of one or more computing systems, causes at least one data processor to perform operations herein. Similarly, computer systems e also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE FIGURES

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

In some implementations, the current subject matter relates to selective pairing of wireless communication devices. The pairing can be performed in a wireless communications system, which can implement a variety of wireless connection technologies, e.g., WiFi, BLUETOOTH®, long-term evolution ("LTE") systems, etc. The pairing can be performed by a pairing device. The pairing device can scan for an advertising packet (e.g., a data, a packet, and/or a data packet that can contain information and/or identifier for a particular product being advertised). Then, each scanned advertising packet can be checked for a shared key. Only when the shared key is found, the pairing device can respond to the scanned advertising packet. In some exemplary implementations, finding a shred key can be followed by checking whether the shared key matches with the right key the pairing device is looking for. The pairing device can be programmed to respond to any shared key and/or to a predetermined key (e.g., the key that it is looking for).

Figure 1A:
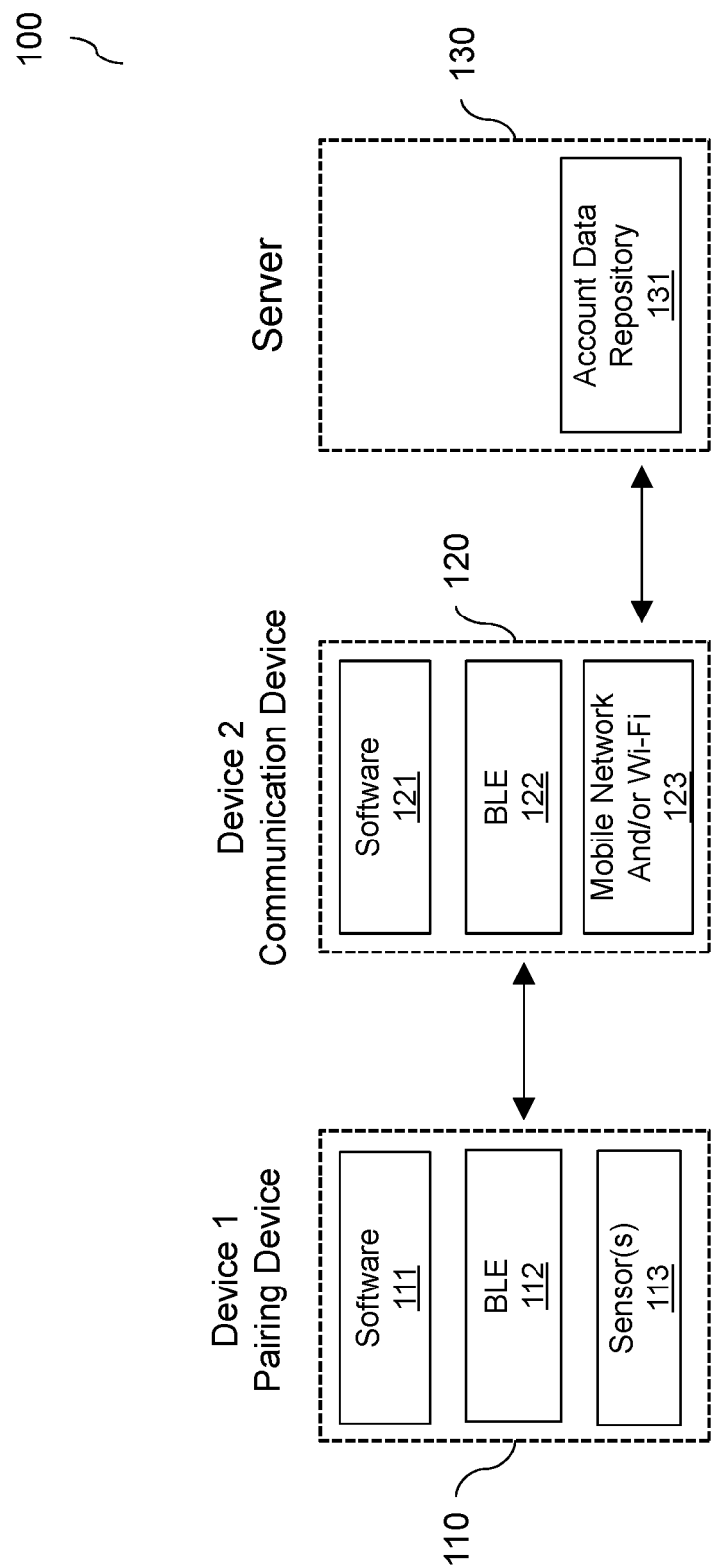
FIG. 1a illustrates an exemplary system for performing selective sharing of wireless devices using shared keys, according to some implementations of the current subject matter.

FIG. 1a illustrates an exemplary system 100 for performing selective sharing of wireless devices using shared keys, according to some implementations of the current subject matter. The system 100 can include a device 1 110, a device 2 120, and a server 130, each of which can be communicatively coupled to one another via various communications technologies.

The device 1 can be a pairing device that can include a software component 111, BLUETOOTH® Low Energy ("BLE") communication capability component 112, and one or more sensors 113. The device 1 can also referred to as the selective pairing or "stealth" device. The device 1 110 can be provided with selective pairing technology capabilities (e.g., software and/or hardware including computer instructions that when executed by one or more processors implements one or more features of the current subject matter). In some implementations, the device 1 can include a data memory, which can be larger than other sensor devices (e.g., existing devices that do not operate in the selective pairing mode). This can allow storage of additional sensor data that is not transmitted while device 1 operates in the selective pairing mode (or the "stealth" mode) prior to pairing.

In some implementations, device 1 110 might not require human machine interface ("HMI") for BLE purposes. In some implementations, device 1 110 can include an input mechanism (not shown in FIG. 1a), such as one or more buttons, a touchscreen a keyboard, and/or any other suitable mechanisms. The input mechanism can facilitate the pairing process, e.g., by enabling a user of the device 1 to enter a passcode, select a pairing option, etc., and/or perform various other functions, e.g., to reset the device 1.

In some implementations, device 2 120 can be a communication device that can be communicatively coupled (e.g., via a BLE, WiFi, etc.) with the pairing device 110. The device 2 can include a software component 121, a BLE communication capability component 122, and a mobile network and/or Wi-Fi adaptor component(s) 123. In some implementations, the device 2 earl be a user equipment, e.g. a cellular telephone, a smartphone, a tablet, and/or other computing device, having internee access capability. The network adaptor component 123 can be used to communicate data via a mobile network, Wi-Fi, and/or any other technologies (e.g., Zigbee, Sub-GHz, etc.). The device 2 120 can also include BLE capabilities as well as selective pairing technology capabilities.

In some implementations, the device 2 120 can be communicatively coupled to a server 130, e.g., via a mobile network, Wi-Fi, and/or any other data communication technologies. In some implementations, the server 130 can include an account data repository 131, which can include a database for storing user info including, for example, shared key(s), access right level, etc. In some implementations, a user can manage the account data repository 131 via a communication device 120. The server 130 can instruct the device 2 120 to connect with the device 1 110 to receive/transmit data/information, from the one or more sensors) 113. The server 130 can also manage device 1 110 and device 2 120. The system 100 can be particularly useful, for example, in situations where data collection and/or control of the pairing device is/are performed without human intervention.

Figure 1B:
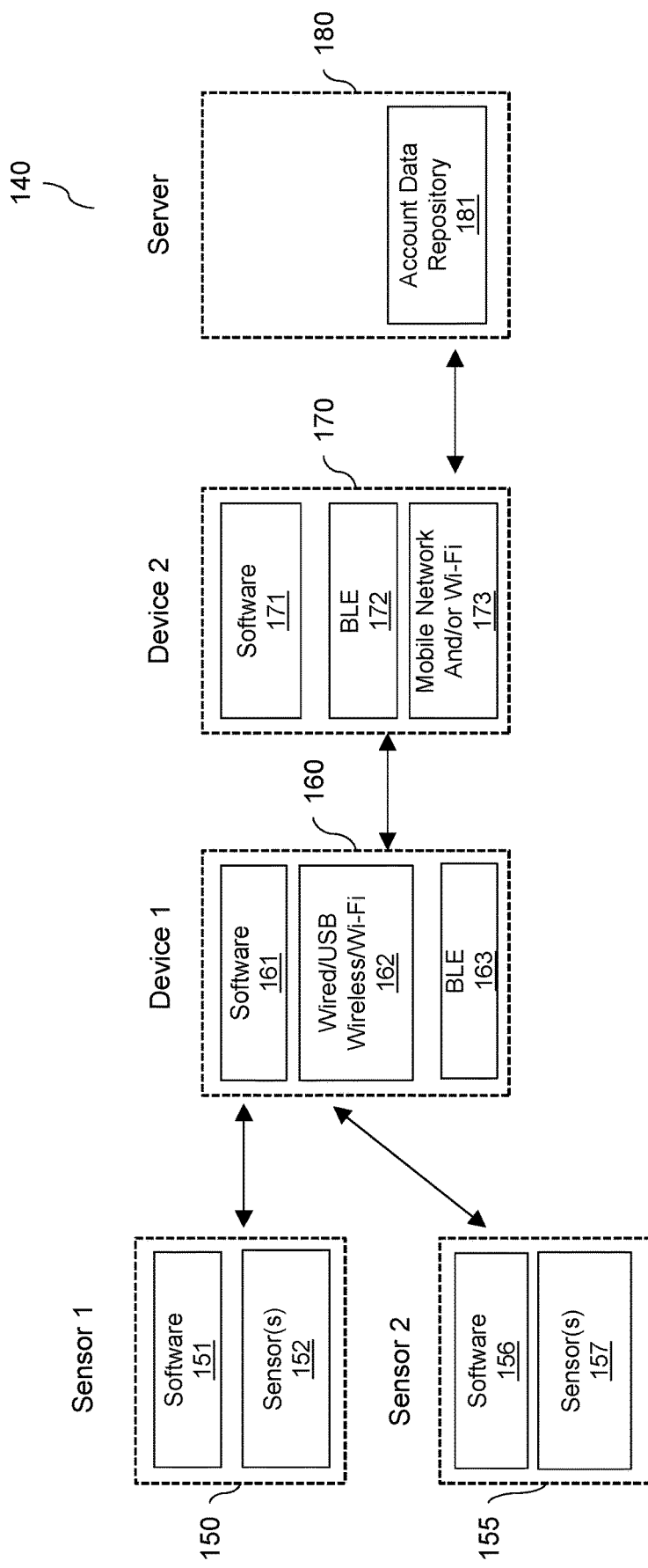
FIG. 1b illustrates another exemplary system, according to some implementations of the current subject matter.

FIG. 1b illustrates an exemplary system 140, according to some implementations of the current subject matter. The system 140 can include a sensor 1 150, a sensor 2 155, a device 1 160, a device 2 170 and a server 180, which can include an account data repository 181. The system 140 bears some similarity to system 100 shown in FIG. 1a. As shown in FIG. 1b, the device 1160 can include a software component 161, a wired/USB/wireless/Wi-Fi component 162 and a BLE component 163. The device 160 can be communicatively coupled to the sensor 1 150 and sensor 2 155. The device 160 can obtain one or ore sensor data from the sensors 150, 155. The current subject matter s not limited to the two sensors 150, 155, and as can be understood by one skilled in the art, any number of sensor devices can be provided. Additionally, the device 1 160 can also include one or more sensors (not shown in FIG. 1b).

The device 2 170 can include a software component 171, a BLE component 172, and a mobile network and/or Wi-Fi component 173. Similar to the devices 110 and 120 shown in FIG. 1a, the device 2 170 can be communicatively coupled with the device 160, such as via BLE communications technology.

The sensor device 150 can include a software component 151 and a sensor component(s) 152. Similarly, the sensor device 155 can include a software component 156 and a sensor component(s) 157. As stated above, sensors 150, 155 can provide various sensor data to the device 1 160.

While FIGS. 1a-b illustrate two devices (i.e., devices 1 and 2), as can be understood by one skilled in the art, any number of devices can be included in the current subject matter's communications systems, as for example, illustrated in FIGS. 2 and 3 and discussed below.

Figure 2:
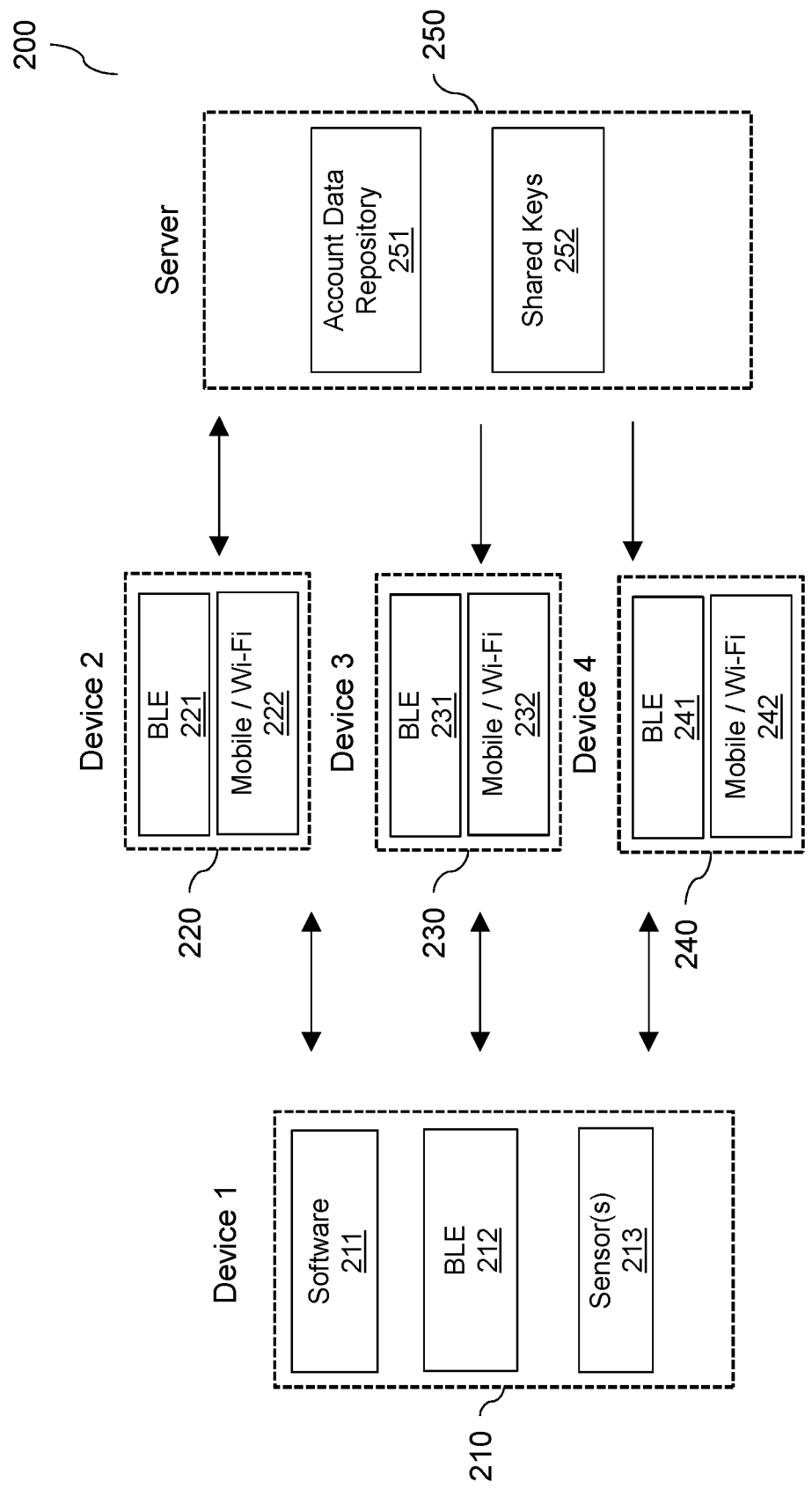
FIG. 2 illustrates an exemplary system for pairing devices, according to some implementations of the current subject matter.

FIG. 2 illustrates an exemplary system 200 for pairing devices, according to some implementations of the current subject matter. The system 200 can include a pairing device 1 210, communication device 2 220, communication device 3 230, communication device 4 240 and a server 250. The device 210 can include a software component 211, a BLE component 212, and sensor(s) 213. The devices 220-240 can include BLE components 221, 231, 241, respectively, and mobile/Wi-Fi components 222, 232, 242, respectively. The devices 220-240 can be communicatively coupled with the pairing device 210 as well as the server 250. The server 250 can include an account data repository 251 for storage of account information pertaining to a particular user and/or a device, and a shared keys repository 252.

Devices 220-240 and/or their users can access account information stored in the server 250 and can receive one or more shared key(s) 252 from server 250. Users can also create user accounts for storage on the server 250, register their devices (e.g., device 210) and associate the registered devices with their account. As can be understood any number of servers 250 can be included in the system 200.

In some implementations, a user can log into the server 250 from one of the communication devices 220-240. Once the user is successfully authenticated by the server 250, the user can manage one or more of the pairings between the pairing device 210 and the communication devices 220-240. For example, if the user wishes to pair a new pairing device that had not been paired before, the server 250 can generate and/or retrieve a shared key from the shared key repository 252 and transmit the shared key to the communication device using which the user is communicating with the server 250. The shared key can then be distributed to the pairing device. This process can be repeated for each pairing device that the user wish to pair increase security, the pairing device(s) can respond only to packets that have been signed (and/or acknowledged) using a shared key. In some implementations, the shared key can have a fixed and/or variable length of digital data. It can be several digits to 128 bits, 256 bits, etc. It can have a structure similar to a header and can include an identifier to specify type of device 1, device 2, a server, and/or a user. In some exemplary implementations, the shared key can be a random binary string. The shared key can be generated on the server side so that the server can determine whether the generated key is a unique binary string in the system. As shown in FIG. 2, the shared key repository 252 can contain one or more shared keys.

Figure 3:
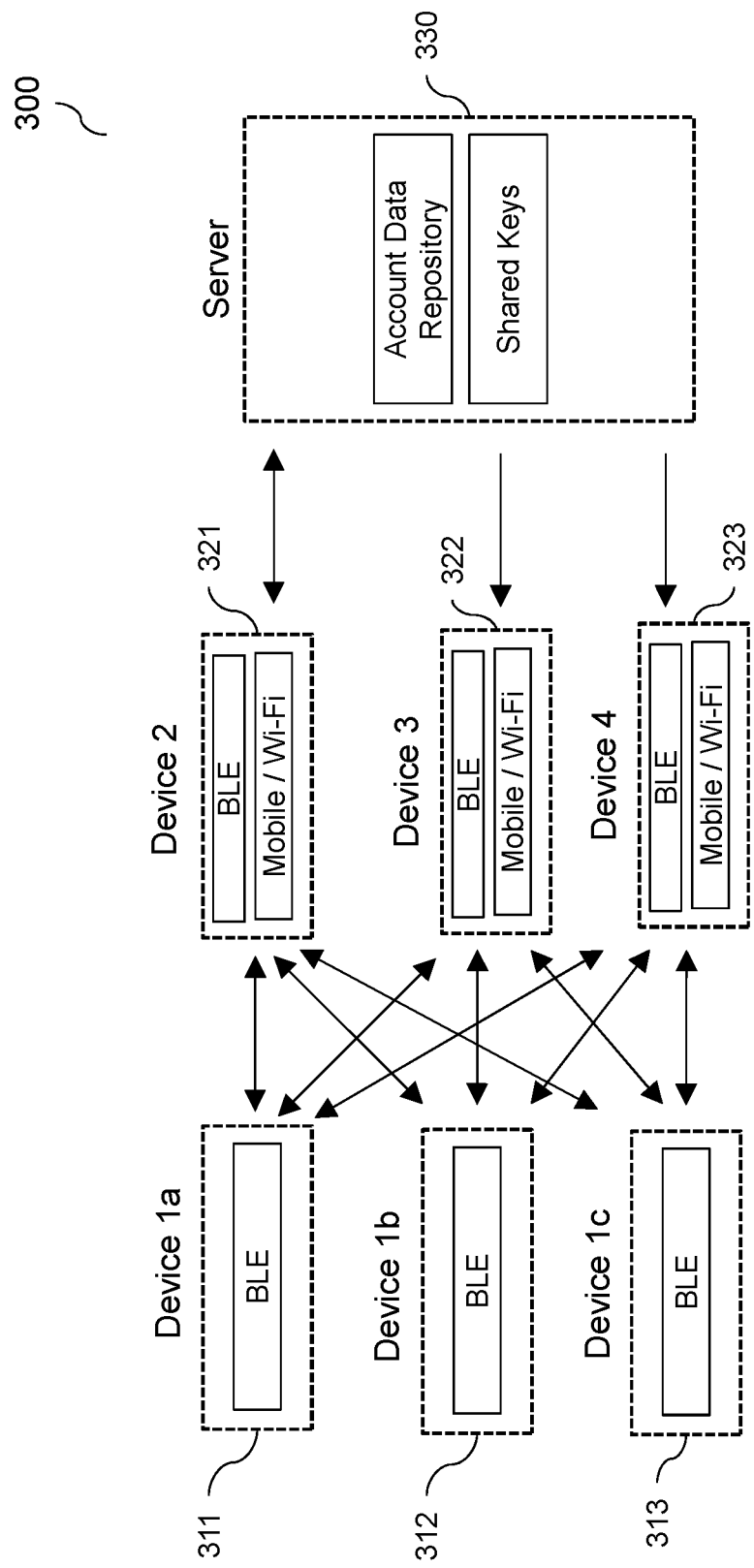
FIG. 3 illustrates an exemplary system for pairing devices, according to some implementations of the current subject matter.

FIG. 3 illustrates an exemplary system 300 for pairing devices, according to some implementations of the current subject matter. System 300 is similar to the system 200 shown in FIG. 2. The system 300 can include a plurality of pairing devices 1a 311, 1b 312, and 1c 313, a plurality of communication devices 2 321, 3 322, 4 323, and a server 330. The pairing devices 311-313 can include respective BLE components and/or any other components. Similar to the communication devices of system 200, the communication devices include respective BLE and mobile/Wi-Fi components. Any pairing device 311-313 can communicate with any communication device 321-323. As stated above, any number of pairing devices, communication devices, and/or servers can be provided.

In some implementations, the server 330 can store a single key that can be used for multiple pairing devices. The single key can be a global shared key and/or a user-specific shared key. The global shared key can be a key that is not unique to user and/or a user account. In some exemplary implementations, same products, manufacturer(s), type(s) of product, make(s), etc. can be assigned the same global shared key when they are shipped from a manufacturer. When a product type is known, e.g., a user purchased a new device that needs to be paired for the first time, device 2 can advertise a global shared key, which is known that that product can accept, and initiate communication with device 1 which is in stealth mode. In some exemplary implementations, the global shared key, i.e. the data string itself, might not be published. A user specific shared key can be the same kind of data string as the global shared key and its structure and use are further discussed below. Key lengths of the global shared key and the user specific shared key can be the same and/or different.

In alternative implementations, different keys can be generated and stored by the server 330. Each such key can be assigned to one or more pairing devices. For example, at the time of manufacturing/shipment of devices 311-313, different global shared keys can be generated and stored for each device 311-313. A single and/or a plurality of pairing devices can be associated with a single user account. Each pairing device can have a different global key and/or user-specific shared key. The server 330 can store the key and associate it and/or stored it together with the user account information.

In some implementations, the communication devices 321-323 can transmit raw shared key values in an advertising data packet (i.e., a data, a packet, and/or a data packet containing information about a particular product being advertised) and/or any other data packet to pairing device(s) 311-313. In some implementations, the raw shared key values can indicate that the shared keys can be strings of binary data, as discussed above. The values are transmitted in such a way that the pairing device(s) 311-313 do not need to decrypt all data packets all the time, thereby saving energy consumption and/or computing power. In some implementations, the advertising data packet payload containing shared keys can be encrypted. This can ensure that the information transmitted will not be accessed by anyone who is not authorized to do so. Further, additional measures of security, as discussed below, can be implemented.

In some implementations, a shared key (e.g., global or user-specific) can be shared in the same bits/bytes form among the pairing device, communication device and/or server. In some implementations, ever if encrypted, the shared key can be identical, for example, bit by bit, when decrypted. In some implementations, a shared key need not be identical, for example, between/among the pairing device, communication device, and/or server. For example, the pairing device can have an internal conversion table to convert a piece of information the pairing device received (that is different from the key itself) to the key that is intended to be used.

In some implementations, a pairing device can be configured to receive one or more user-specific shared keys (and its update(s) as well as updated global shared key(s)). Instead of receiving a key in one piece of information, the pairing device can receive two or more pieces of information from a communication device and/or a server to construct the shared key internally based on these pieces of information. The pieces of information for constructing a shared key can be transmitted separately. This can be particularly useful in order to increase security by separating the pieces of information such that the shared key cannot be reconstructed without all of the pieces. Thus, an attacker (e.g., a hacker) who received only some of the pieces of information cannot reconstruct the shared key and will not be able to access the device.

In some implementations, the pairing device can be provided with a private key. The communicating device and/or server encrypt the shared key with a public key, and can transmit the encrypted shared key to the pairing device. In this way, the pairing device needs two pieces of information (i.e., the private key and an encrypted shared key data) to decrypt and obtain the shared key.

In some implementations, the shared key can be further concealed (in addition to encryption) by appending various data to the shared key prior to encryption. Adding text to the shared key can vary the cypher text so that the cypher text and the encrypted advertising packet payload can be different each time. In some example implementations, a part and/or whole of access address, which can be a part in the header, can be added to the shared key prior to encryption. The access address can be a different value in each attempt of shared key selective paring process. The access address can be changed each time. In alternate exemplary implementations, the access address can be taxed for a predetermined period of time and/or for a number of pairing attempts. In some exemplary implementations, each advertising packet can have a different access address. The added text can be obtained from the header of the packet. Upon receipt of the shared key with the additional text, device 1 can decrypt the payload and determine whether the decrypted shared key matches one of the known shared keys, and/or whether the decrypted payload contains a part of the header of the packet to verify that the payload was actually encrypted by the trusted device 2. If the decrypted payload does not contain a part of the header, the device 1 can determine that the payload is not an authentic advertising packet and thus, will not respond to it, e.g., by staying in stealth mode.

Figure 4:
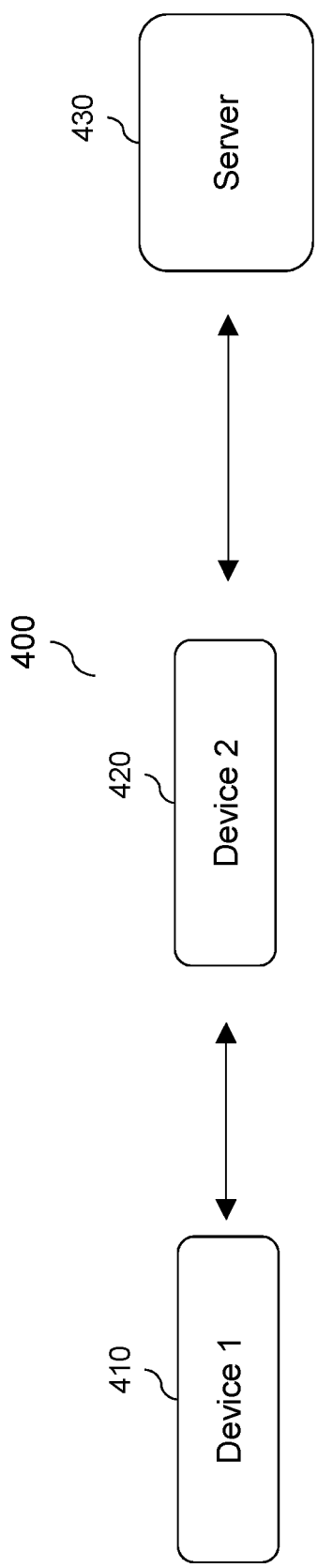
FIG. 4 illustrates an exemplary system for performing shared key selective pairing ("SKSP"), according to some implementations of the current subject matter.

FIG. 4 illustrates an exemplary system 400 for performing shared key selective pairing ("SKSP"), according to some implementations of the current subject matter. The system 400 can include a pairing device 1 410, a communication device 2 420 and a server 430. The devices 1 and 2 can be communicatively coupled with a BLUETOOTH® connection and/or any other connection. Device 2 and the server 430 can be communicatively coupled via a network, e.g., an Internet, WAN, LAN, MAN, etc. To improve data security, the pairing device 410 can selectively pair with the communication device 420, such that the pairing device 410 can transmit/broadcast (e.g., the pairing device can be a beacon that can transmit data which can be received by any device in its vicinity) data only in response to a communication from the communication device 420, which can include a shared key that is recognized by the pairing device 410.

The selective pairing technology described herein is particularly advantageous when the pairing device 410 contains sensitive private data, such as, medical data, patient data, banking transaction data, and/or any other private data. For example, the pairing device 410 can be a blood glucose meter, a body composition meter, a blood pressure meter, a thermometer, a heart rate monitor, etc. One or more of the pairing devices 410 can communicate with one or more communication devices 420, which can include at least one of the following: a cellular telephone, a smartphone, a tablet, a personal computer, a laptop, etc. The communication device(s) 420 can communicate with the sensor 430 in order to, for example, manage a user account that can be accessed using the pairing device 410.

Figure 5:
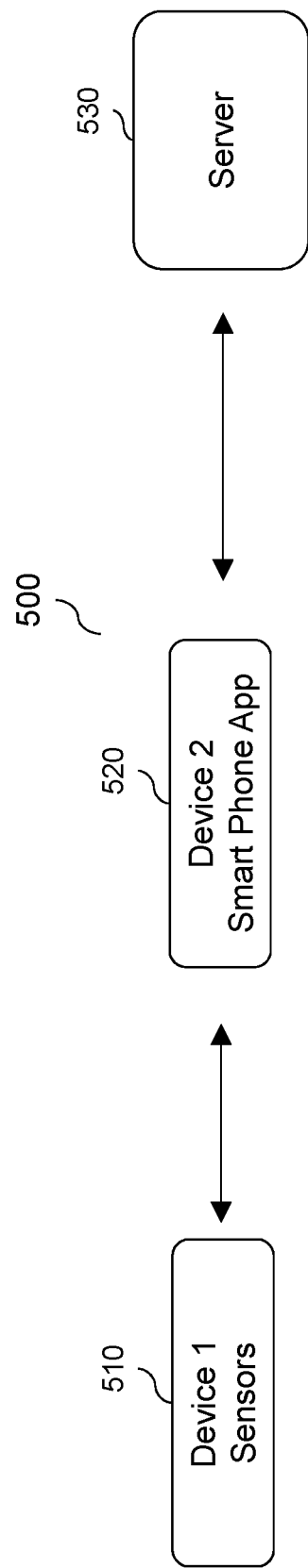
FIG. 5 illustrates another exemplary system for performing shared key selective pairing, according to some implementations of the current subject matter.

FIG. 5 illustrates another exemplary system 500 for performing shared key selective pairing, according to some implementations of the art subject matter. The system 500 can include a pairing device 1 510, a communication device 2 520 and a server 530. The devices 1 and 2 can be communicatively coupled with a BLUETOOTH® connection and/or any other connection. Device 2 and the server 530 can be communicatively coupled via a network, e.g., a mobile Wi-Fi network and/or any other network. The pairing device 510 can include one or more sensors, as described above. During process performed by the system 500, the pairing device 510 does not broadcast data indiscriminately, rather, it can for advertising packets using a shared key, e.g., global and/or user-specific key, and only respond when a shared key is found in the advertising packet payload. In some exemplary implementations, the pairing device can look for a set of numbers that can share the same mathematical characteristics, which can mean that instead of looking for an exact match with keys stored by the pairing device, the pairing device can plug a number from the set of numbers into a function to determine whether there is match with characteristics of the set of numbers. Once the shared key is found, the pairing device 510 can transmit data including at least one of the following: data attribute(s), name(s), serial number(s), MAC address(es), etc., to the communication device 520 as a part of device registration. In some implementations, both types of shared keys can be updated using the communication device 520. The communication device 520 can be at least one of the following: a telephone, a mobile telephone, a smartphone, a tablet, a personal computer, a laptop, and/or any other device.

The communication device 520 can broadcast advertising packets only when necessary. The communication device 520 can include a global key inside the advertising packet payload, and/or a user-specific key, as desired, e.g., after the pairing device 510 has been registered with a user account. In some implementations, the registration of the pairing device 510 can include storing the pairing device's MAC address and/or product serial number.

The server 530 can include a database that stores various data for each user account including at least one of the following: a user name, an e-mail address, a product type, a MAC address, a serial number, a global shared key, a user-specific key(s), and/or any other information.

In some implementations, the pairing device 510 can broadcast an advertising packet containing a product name and/or any ID code. A user can use the communication device 520 to start scanning and look for a predetermined product name and/or ID code. Once the user selected the product name and/or ID code of the pairing device 510, a pairing between the devices 510 and 520 can be initiated and a BLE connection can be established. A specific shared key for the user and the pairing device 510 combination can be generated at the server 530 and/or at the device 520 and can be sent to the pairing device 510. In some implementations, the shared key may not be based on and/or derived from the device serial number and/or MAC address and/or be based on a unique value that can be specific to the pairing device 510 and/or the communication device 520, and/or a value generated based on devices' hardware specific values. In some implementations, the shared key can be unique to the user and can be generated without any dependency on the pairing device and/or the communication device.

In some implementations, the pairing device 510, communication device 520, and the server 530 can all store the same shared key, e.g., a global and/or a user-specific shared key. In some implementations, once the pairing device 510 has the shared key, it can stop broadcasting advertising packets and move to scan mode, thereby entering a selective pairing or "stealth" mode. In some exemplary implementations, the device 520 and the server 530 can share the same shared key, e.g., a user-specific shared key. Alternatively, the devices 510, 520 and the server 530 can share the same shared key, e.g., a global shared key. Further, in alternate implementations, the device 510 may or may not have a shared key. Moreover, the device 510 can broadcast an advertising packet so that the device 520 can find it and establish a connection. In further implementations, the device 520 can confirm that the device 510 has the appropriate key, e.g., a global shared key. For example, a confirmation of the device 510 identifier can be sufficient to confirm that device 510 is the device that the device 520 was looking for. Alternatively, the device 510 can receive a user-specific shared key from the device 520 and can enter into a selective pairing or stealth mode. In the stealth mode, the communication device 520 can initiate communication with the pairing device 510 by broadcasting advertising packet(s) that can contain a shared key, e.g., a global and/or a user-specific shared key, that was already stored and/or pre-set in the pairing device 510, e.g., when the product was made and/or at the time of product shipment. The pairing device 510 can scan for advertising packet(s) from the communication device 520 and can match the shared key contained in the packet to the pre-set shared key of the pairing device 510. When a match is found, the pairing device 510 can send a connection request in response to the advertising packet from the communication device to establish pairing and can maintain connection between the devices.

In some implementations, a global shared key can also be shared between devices 510, 520 and the server 530. In some implementations, the global shared key can be shared only among the same product type and software application type running on the device 520.

In some implementations, the pairing device may never need to broadcast any advertisement packets in use. For example, the pairing device can communicate with a communication device using a global shared key. In some implementations, further communications can also be established using a user-specific shared key instead of a global shared key.

In some implementations, the pairing device can receive a specific shared key for a specific combination of the pairing device and the user, and can store it for future use.

In some implementations, there can be two or more global shared keys. For example, one key can be a general-purpose key stored on the pairing device, which can be stored at the time of shipment of the device from its manufacturer, and the other one key can be a global key that can be newly stored in the pairing device and/or a replacement general purpose key. In some implementations, the pre-set key can become known, and thus, the pairing device can be updated (e.g., on-demand, frequently, periodically, manually, etc.) with a new replacement global key in order to improve security.

In some implementations, in order to use the current subject matter system, the user can be requested by the communication device (e.g., devices 220, 230, 240, as shown in FIG. 2) to enter user's login information in order to login into user's account. If the user is already logged in, the communication device can perform one or more checks. The checks can include at least one of the following: a check for device registration status, shared key(s), a measurement of data update, a change flag to determine whether there are other tasks for the communication device to execute (other than receiving data from the pairing device, and/or changing pairing device state(s)) and/or any other checks. The checks can be used to ensure proper operation of the current subject matter system.

The device registration status can include an indication as to whether the device is or is not registered to any user or to which user account the device is registered. For example, if the device is registered to a second user account, access to the device from a first user account, that is different from the second user account, can be denied. This can prevent registration and/or use of the device that is registered to a user account that is not the account that is being used to access the device. This can prevent duplicate device registrations, which can cause data incoherency and/or other problems.

When the communication device needs to connect with the pairing device (e.g., to receive data from the pairing device and/or to send out data and/or instructions to the pairing device), the communication device can broadcast one or more advertising packets. The advertising packets can contain the communication device and/or the pairing device's addresses. Using such advertising packets, the communication device can perform direct advertising of a product. The communication device can establish a fast connection y using directed advertising packet that can contain the communication device's and/or the pairing device's addresses. This packet can be sent continuously.

In some implementations, the pairing device, upon receiving the advertising packet, can compare a length and a type of information contained in the received advertising packet with predetermined values of the length and type if there is no match, the pairing device can ignore the advertising packet and does not process it. If there s a match, the pairing device can inspect the shared key value contained in the advertising packet. In some exemplary implementations, the shared key value can include two components: one component can indicate that the communication device is a selective-pairing enabled device, and the other component can be specific to a combination of the pairing device and/or user account being used to access the device. If the pairing device determines that the shared key is valid, the pairing device can transmit a connection request packet to the communication device. Once the connection is established, the pairing device can transmit and/or receive data to/tram the communication device. Upon establishment of the connection, the communication device can also synchronize data transmitted/received to/from the pairing device with the server.

In some implementations, the advertising packets that use the same shared key can be varied by adding data and/or additional text to the cypher text contained in the advertising packets prior to encryption of the packets. This can enhance security by preventing an unauthorized connection to the pairing device through reuse of one or more of the same advertising packets that had been broadcasted before. This can also conceal the shared key as it would be difficult to identify the shared key contained in the additional data and/or text. In some implementations, a part of and/or an entire header of the advertising packet, such as an access address, can be used as the additional data/text to be included with the shared key. Upon receipt of the advertising packet, the pairing device can verify the shared key and determine whether the advertising packet was actually encrypted by the communication device. For example, if the decrypted advertising packet does not contain a part of the header, the pairing device can determine that the advertising packet is not an authentic SKSP advertising packet, and thus, remain in a stealth mode.

Similar process can be applicable to systems that can include multiple pairing devices and/or multiple communication devices, which can be accessed by the user, as shown in FIG. 3. The multiple pairing devices can be registered to a single user account contained on the server 330, as shown in FIG. 3, to allow sharing of the same user-specific shared key. Thus, when communication device 321 broadcasts an advertising packet with the user-specific shared all pairing devices 311-313 can respond and the communication device 321 can transmit/receive data to/from any and/or all of the pairing devices. In some implementations, the communication device 321 can operate in an offline mode, in which device 321 has no and/or intermittent connection with the server 330. In the offline mode, device 321 can perform functions of the server 330. In an offline mode, device 321 communicate with devices 311-313 because device 321 can store a user-specific shared key. Device 321 can synchronize server 330 when connection is available. In particular, device 321 can switch between online mode and offline mode. Moreover, when connection is not available, device 321 can manually and/or automatically enter into the offline mode. The device can enter online mode when connection is available manually and/or automatically.

Figure 6:
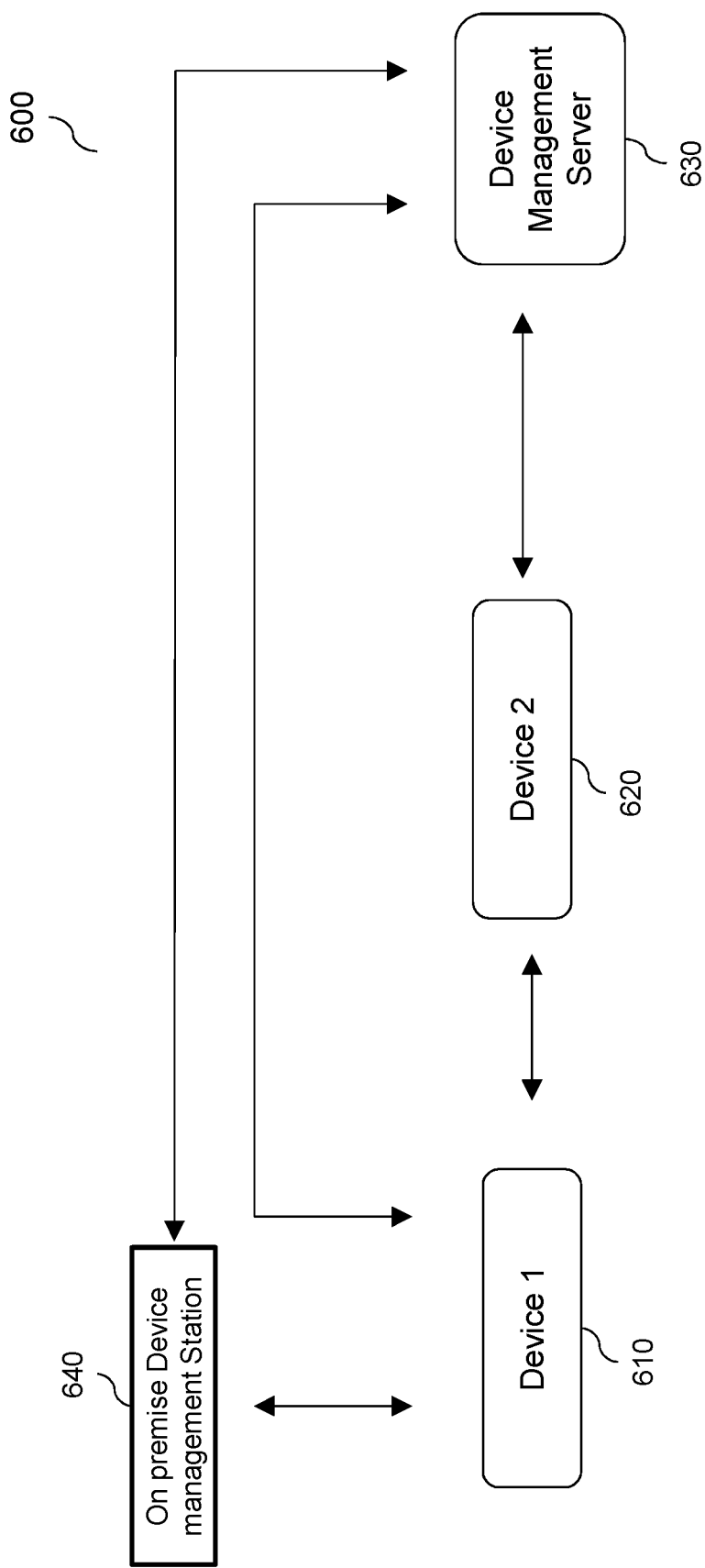
FIG. 6 illustrates another exemplary system for performing shared key selective pairing, according to some implementations of the current subject matter.

FIG. 6 illustrates another exemplary system 600 for performing shared key selective pairing, according to some implementations of the current subject matter. The system 600 can include a pairing device 1 610, a communication device 2 620, a server 630, and an on premise device management station 640. The devices 1 and 2 can be communicatively coupled with a BLUETOOTH® connection and/or any other connection. Device 2 and the server 630 can be communicatively coupled via a network, e.g., a mobile Wi-Fi network, WAN, LAN, MAN, Internet, and/or any other network. The station 640 can be communicatively coupled with the device 610 using a network, e.g., a mobile Wi-Fi network, WAN, LAN, MAN, Internet, and/or any other network, as well as using a direct connection, such as a USB Additionally, the station 640 can also be communicatively coupled with the server 630 via a network, e.g., a mobile Wi-Fi network, WAN, LAN, MAN, Internet, and/or any other network, as well as using a direct connection. Cloud servers and/or on premise servers can be used to provide connection between the station 640 and the server 630. In some exemplary implementations, the system 600 can be implemented in a hospital setting. Device 610 can include at least one of the following: a blood glucose meter, a body composition meter, a blood pressure meter, a thermometer, a heart rate monitor, and/or any other medical and/or non-medical device. Device 620 can be a mobile telephone, a smartphone, a tablet, a personal computer, a laptop, and/or any other device. The sever 630 can be a cloud server and/or any other type of server. The server 630 can perform processing and/or storage of data and can include one or more processors and/or more memory locations. In some exemplary implementations, the device management station can be a battery charger, a communication bridge between device 610 and the server 620, and/or any other type of device.

Figure 7:
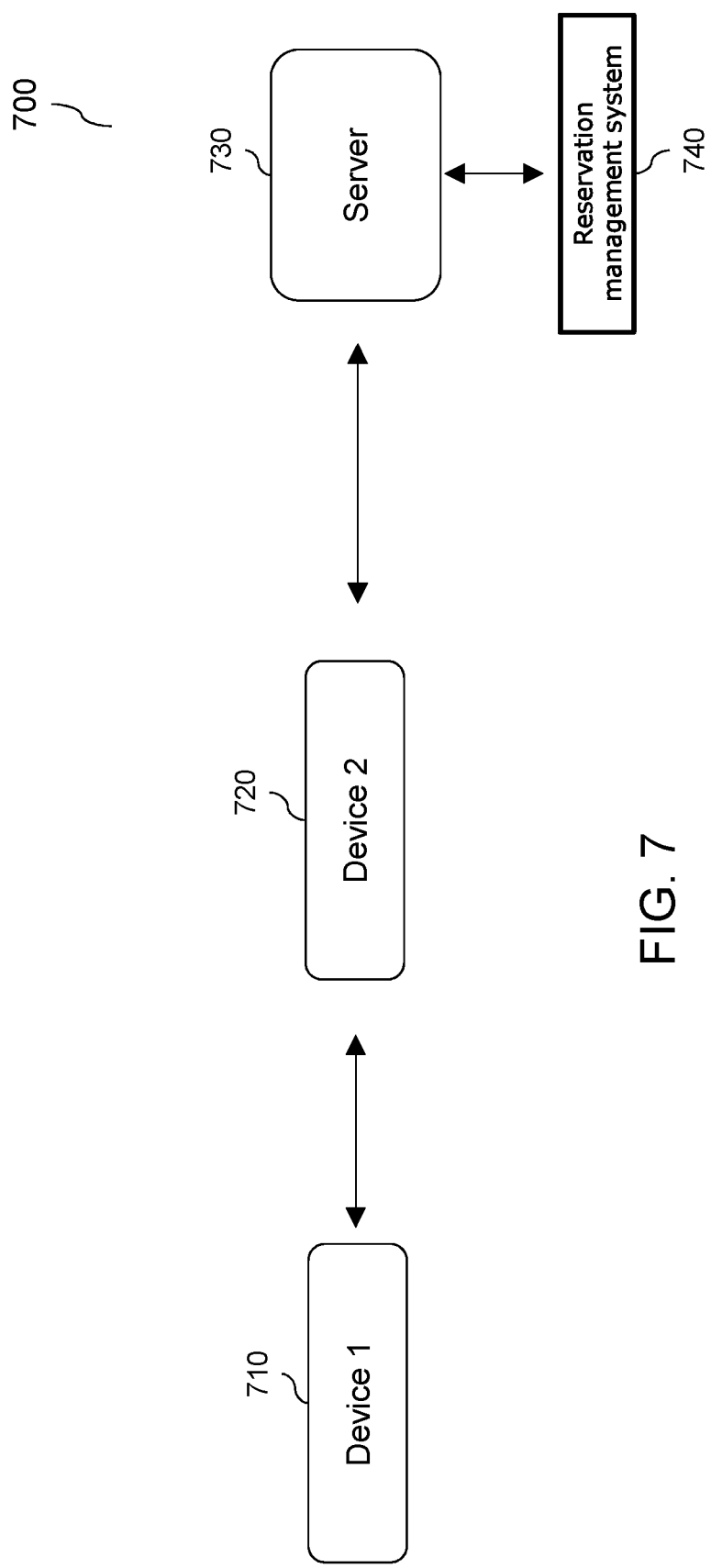
FIG. 7 illustrates another exemplary system for performing shared key selective pairing, according to some implementations of the current subject matter.

FIG. 7 illustrates another exemplary system 700 for performing shared key selective pairing, according to some implementations of the current subject matter. The system 700 can include a pairing device 1 710, a communication device 2 720, a server 730, and a reservation management system 740. The devices 1 and 2 can be communicatively coupled with a BLUETOOTH® connection and/or any other connection. Device 2 and the server 730 can be communicatively coupled via a network, e.g., a mobile Wi-Fi network, WAN, LAN, MAN, Internet, and/or any other network. The system 740 can be communicatively coupled with the server 730 using a network, e.g., a mobile Wi-Fi network, WAN, LAN, MAN, Internet, and/or any other network, as well as using a direct connection. Cloud servers and/or on premise servers can be used to provide connection between the system 740 and the server 730.

In some exemplary implementations, the system 700 can be implemented in a hotel and/or a facilities management setting. Device 710 can include at least one of the following: a door lock mechanism in a hotel, office, home, locker room, amusement park entrance, a security sensor, a utilities management sensor (e.g., air conditioning, heating, lighting, etc.), automotive keyless entry system, e.g., automotive keyless entry for a rental car and/or car sharing, and/or any other medical and/or non-medical device. Device 720 can be a mobile telephone, a smartphone, a tablet, a personal computer, a laptop, and/or any other device. The sever 730 can be a cloud server and/or any other type of server. The server 730 can perform processing and/or storage of data and can include one or more processors and/or more memory locations.

Figure 8:
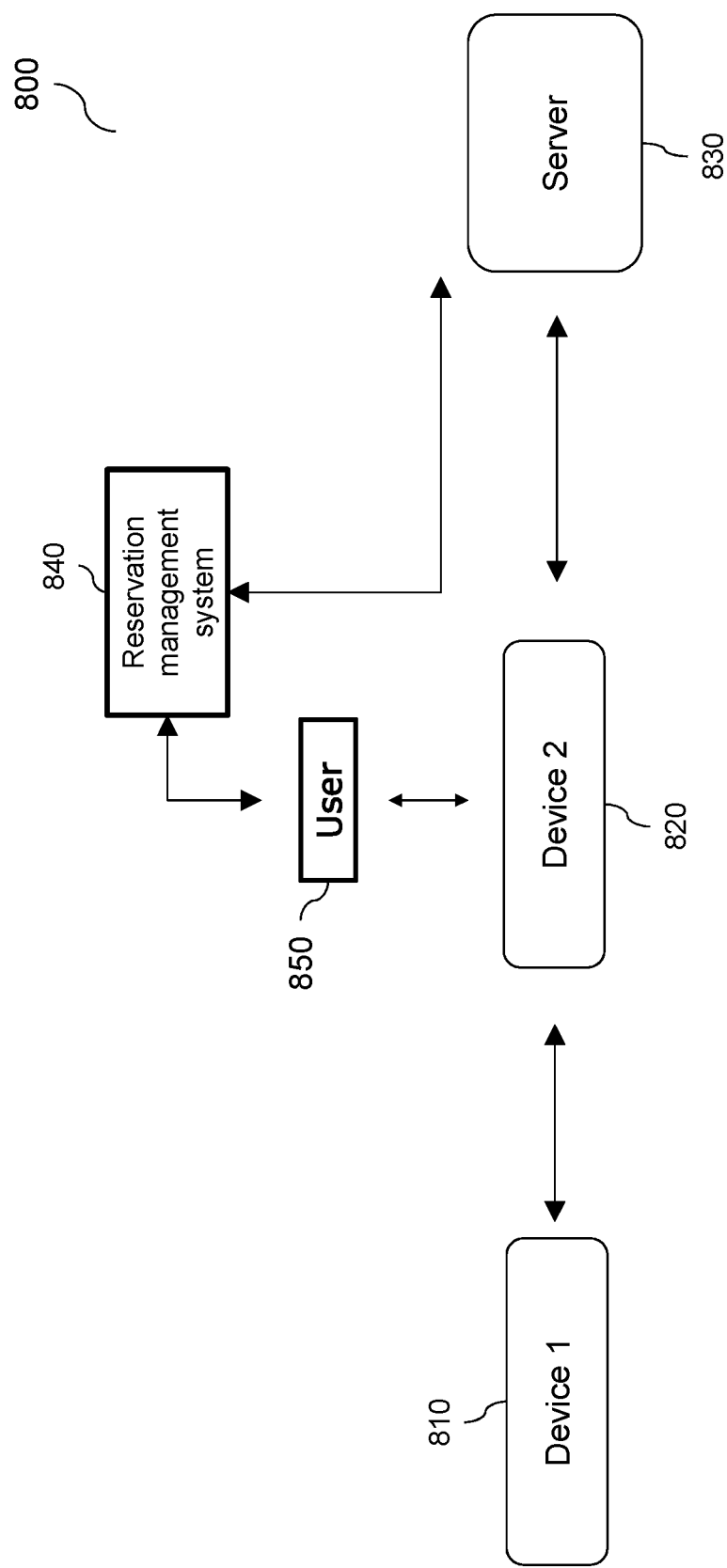
FIG. 8 illustrates yet another exemplary system for performing shared key selective pairing, according to some implementations of the current subject matter.

FIG. 8 illustrates yet another exemplary system 800 for performing shared key selective pairing, according to some implementations of the current subject matter. The system 800 is similar to the system 700 shown in FIG. 7 and can be used in a similar setting as the system 700. The system 800 can include a pairing device 1 810, a communication device 2 820, a server 830, and a reservation management system 840. The devices 1 and 2 can be communicatively coupled with a BLUETOOTH® connection and/or any other connection. Device 2 and the server 830 can be communicatively coupled via a network, e.g., a mobile Wi-Fi network. WAN, LAN, MAN Internet, and/or any other network. The system 840 can be communicatively coupled with the server 830 using a network, e.g., a mobile network, WAN, LAN, MAN Internet, and/or any other network, as well as using a direct connection. Cloud servers and/or on premise servers can be used to provide connection between the system 840 and the server 830. A user 850 can be communicatively coupled and can access the device 820 and the reservation management system 840.

In some exemplary implementations and similar to the system 700 shown in FIG. 7, the system 800 can be used in a hotel and/or a facilities management setting. Device 810 can include at least one of the following: a door lock mechanism in a hotel, office, home, locker room, amusement park entrance, a security sensor, a utilities management sensor (e.g., air conditioning, heating, lighting, etc.), automotive keyless entry system, e.g., automotive keyless entry for a rental car and/or car sharing, and/or any device. Device 820 can be a mobile telephone, a smartphone, a tablet, a personal computer, a laptop, a czar key, and/or any other device. The sever 830 can be a cloud server and/or any other type of server. The server 830 can perform processing and/or storage of data and can include one or more processors and/or ore memory locations.

In some implementations, the user 850 can use the system 800 to purchase a hotel room stay by accessing the reservation management system 840 via device 820. To do so, the user 850 can use the device 820 to login to the server 830 using the user account information in order to receive data/information from the server 830. The se 830 can store user account information that can include at least one of the following: user name, contact information, MAC address and/or S/N, global shared key, user specific key, and/or any other information to identify the user. The device 820 can then broadcast an advertising packet, which can include a global key and/or a user-specific key in the advertising packet's payload. The user-specific key can be included in the payload once the device 810's MAC address and/or S/N are confirmed to be valid with data stored on the server 830. Device 820 using the user specific key can then lock/unlock device 810.

Similar to the systems discussed in connection with FIGS. 1a-7, the device 810 can also perform scanning for advertising packets containing global shared key and/or advertising packets containing user specific key once the devices are registered to a particular user. The device 810 can respond to the packets only when a particular shared key is found in advertising packet's payload. Once the shared key is found, device 810's attributes, name, S/N, MAC address, etc. can be sent to device 820 as a part of device registration and both types of keys can be updated by device 820.

The server 830 can also store MAC address/lock location lookup table. The table can be accessed by the reservation management system 840 to provide access to the room during the stay as purchased by the user. The access can also be granted to cleaning crew and/or other authorized individuals by an administrator of the reservation management system 840.

Figure 9:
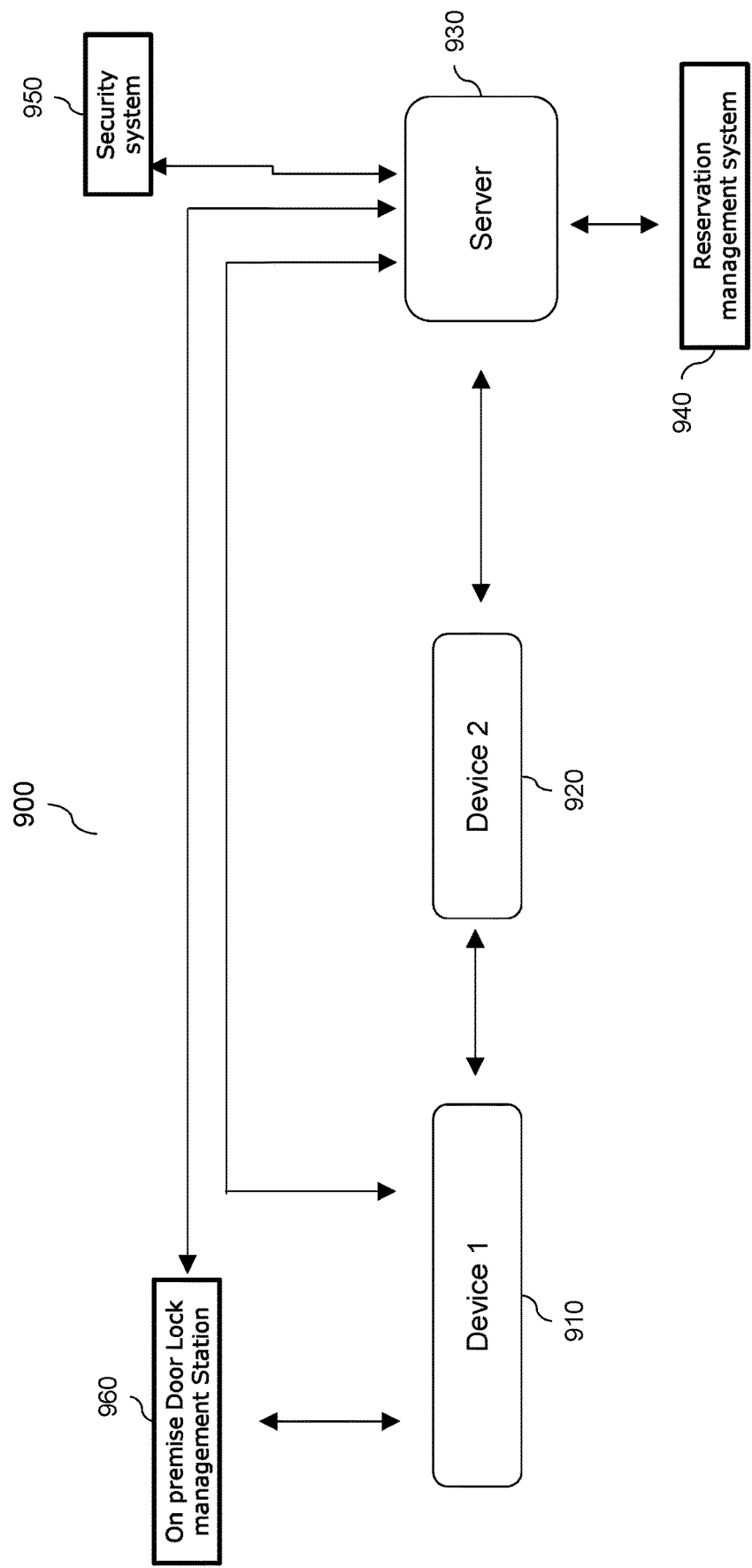
FIG. 9 illustrates another exemplary system for performing shared key selective pairing, according to some implementations of the current subject matter.

FIG. 9 illustrates another exemplary system 900 for performing shared key selective pairing, according to some implementations of the current subject matter. The system 900 can be similar to the system 800 shown in FIG. 8 and can include a pairing device 1 910, a communication device 2 920, a server 930, a reservation management system 940, a security system 950, and an on premise door lock management station system 960. The devices 1 and 2 can be communicatively coupled with a BLUETOOTH® connection and/or any other connection. Device 2 and the server 930 can be communicatively coupled via a network, e.g., a mobile Wi-Fi network WAN, LAN, MAN, Internet, and/or any other network. The system 940 can be communicatively coupled with the server 930 using a network, e.g., a mobile Wi-Fi network, WAN, LAN, MAN, Internet, and/or any other network, as well as using a direct connection. The system 950 can be communicatively coupled with the server 930 using a network, e.g., a mobile Wi-Fi network, WAN, LAN, MAN, Internet, and/or any other network, as well as using a direct connection. The station 960 can be communicatively coupled with the device 910 using a network, e.g., a mobile Wi-Fi network, WAN, LAN, MAN, Internet, and/or any other network, as well as using a direct connection, such as a USB. Additionally, the station 960 can also be communicatively coupled with the server 930 via a network, e.g., a mobile Wi-Fi network, WAN, LAN, MAN, Internet, and/or any other network, as well as using a direct connection. Cloud servers and/or on premise servers can be used to provide connection between the station 960, the system 950, the system 940 and/or the server 930.

In some exemplary implementations, the system 900 can be implemented in a hotel and/or a facilities management setting. Device 910 can include at least one of the following: a door lock mechanism in a hotel, office, home, locker room, amusement park entrance, a security sensor, a utilities management sensor (e.g., air conditioning, heating, lighting, etc.), automotive keyless entry system, automotive keyless entry for a rental car and/or car sharing, and/or any other device. Device 920 can be a mobile telephone, a smartphone, a tablet, a personal computer, a laptop, and/or any other device. The sever 930 can be a cloud server and/or any other type of server. The server 930 can perform processing and/or storage of data and can include one or more processors and/or more memory locations.

The server 930 can manage device 910 and/or device 920. The server 930 can also communicate with the security system 950 to record door operations as well as with the reservation management system 940 to manage door operation authorizations. This way, the server 930 can directly activate and/or deactivate device 920's ability to lock/unlock and/or control device 910. In some implementations, the server 930 can also collect and store door lock operation information such as when a door is open/closed and how it was done. The devices 910, 920 can also perform functions that are similar to the functions of devices 810 and 820 shown in FIG. 8, respectively.

Figure 10:
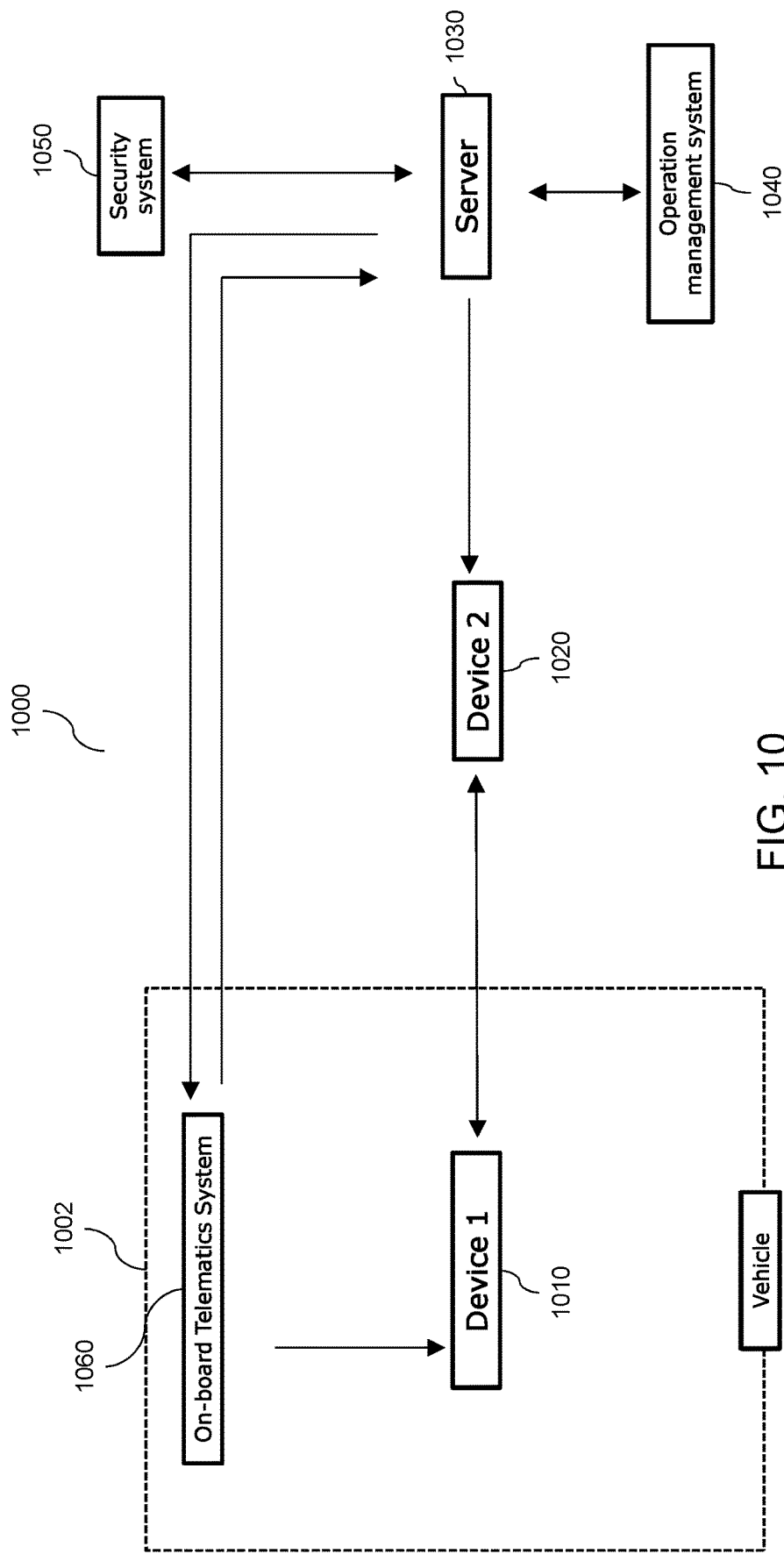
FIG. 10 illustrates another exemplary system, according to some implementations of the current subject matter.

FIG. 10 illustrates yet another exemplary system 1000, according to some implementations of the current subject matter. The system 1000 can be similar to the system 900 shown in FIG. 9 and can include a pairing device 1 1010, a communication device 2 1020, a server 1030, an operation management system 1040, a security system 1050, and an onboard telematics system 1060. The onboard telematics system 1060 can be part of the device 1010, all of which can be incorporated into a vehicle 1002.

The devices 1 and 2 can be communicatively coupled with a BLUETOOTH™ connection and/or any other connection. Device 2 and the server 1030 can be communicatively coupled via a network, e.g., a mobile network, WAN, LAN, MAN, Internet, and/©r any other network. The system 1040 can be communicatively coupled with the server 1030 using a network, e.g., a mobile Wi-Fi network, WAN, LAN, MAN, Internet, and/or any other network, as well as using a direct connection. The system 1050 can be communicatively coupled with the server 1030 using a network, e.g., a mobile Wi-Fi network, WAN, LAN, MAN, Internet and/or any other network, as well as using a direct connection. The system 1060 can be communicatively coupled with the device 1010 using a network, e.g., a mobile Wi-Fi network, WAN, LAN, MAN, Internet, and/or any other network, as well as using a direct connection, such as a USB. Additionally, the system 1060 can also be communicatively coupled with the server 1030 via a network, e.g., a mobile Wi-Fi network, WAN, LAN, MAN, Internet, and/or any other network, as well as using a direct connection. Cloud servers and/or on premise servers can be used to provide connection between the system 1060 the system 1050, the system 1040 and/or the server 1030.

In some exemplary implementations, as stated above the system 1000 can be implemented in a vehicle setting, i.e., device 1010 and system 1060 can be part of the vehicle 1002. Device 1010 can include at least one of the following: a door lock mechanism, an engine ignition, a navigation system, a content purchase system, etc. in a vehicle 1002. Device 1020 can be a mobile telephone, a smartphone, a tablet, a personal computer, a laptop, a vehicle key (e.g., a key fob, etc.), and/or any other device. The sever 1030 can be a cloud server and/or any other type of server. The server 1030 can perform processing and/or storage of data and can include one or more processors and/or more memory locations.

The server 1030 can manage device 1010 and/or device 1020. The server 1030 can also communicate with the security system 1050 to record vehicle operation record and driver information as well as with the operation management system 1040 to manage user operation authorization. This way, the server 1030 can directly activate and/or deactivate device 1020's ability to lock/unlock and/or control device 1010 (and the vehicle itself). The server can prompt the device 1010 to broadcast user shared key to confirm the driver information, i.e., the driver is the person that is supposed to be driving the vehicle 1002. Upon receiving a response from device 1020, the driver information is confirmed. The devices 1010, 1020 can also perform functions that are similar to the functions of devices 810 and 820 shown in FIG. 8, respectively.

In some implementations, devices 1010 and/or 1020 can initiate broadcasting independently of each other. The device 1020 can broadcast user shared key and commence communication with device 1010 to open the door, start engine, etc., provided that device 1010 responds only to the user shared key from device 1020. Device 1010 can start broadcasting user shared key and confirm that the driver has the device 1020 (e.g., vehicle key fob) by receiving response from device 1020. In some implementations, devices 1010 and 1020 can be interchangeable and both can be performing scanning, i.e., in stealth mode.

In some implementations, when one of the pairing devices is reset to an initial setting, that device will not respond to the user-specific shared key. It would only respond to the global shared key.

In some implementations, a different user-specific shared key can be assigned to each pairing devices in a multiple-pairing device system. The server can record user-specific shared keys for each device and associate them with the user account, if appropriate. The communication device can broadcast multiple advertising packets. Each packet can contain one user-specific shared key for each device so that the communication device can selectively communicate with one or more pairing devices. In some implementations, the advertising packet can also contain multiple user-specific shared keys so that the communication device can initiate communication with a plurality of pairing devices contemporaneously.

In some implementations, when the pairing device is reset to an earlier setting (e.g., an initial factory default setting), the pairing device can neglect shared key(s) associated with a user account and only respond to the global shared key. The communication device can send a command to the pairing device to deactivate such user-specific shared key(s). As a result the pairing device can become ready to be linked with a new user account, such as, upon deactivation of a user-specific shared key. The pairing device can be linked with the same account, if the same user chooses to do so.

In so implementations, the pairing device can have: only one shared key active, which can be a global shared key and/or user-specific shared key. The pairing device then can have multiple keys to compare with the content of the advertising packet(s) that it receives.

In some implementations, the communication device can instruct the server to move the shared key information to a list of previously shared keys. This way, if an error occurs during replacement a shared key on the pairing device, this can allow the communication device to attempt to use previously used shared keys to communicate with the pairing device.

In some implementations, a user can request to terminate access to one or more communication devices using user account credentials. Alternatively, the user can terminate access by the user account with regard to a specific communication device associated with the account but not to others. Thus, if access to one communication device is terminated and the user is attempting to use another communication device with the same credentials, the access would not be permitted and the laser will be prompted to login. Additionally, the communication device can determine whether or not the user's login information is valid or not. If not, the user not be permitted to login.

In some implementations, the user can remove a particular pairing device from being associated with the user account, such as when the user determines not to use a particular pairing device anymore, or when the user has lost the pairing device, and/or for any other reason. In some implementations, the communication device can be provided with device management options that can allow the user to register and/or remove one or more pairing devices.

In some implementations, pairing devices can perform scanning for communication devices, advertising packets, shared keys, global shared keys, user specific keys, etc at predetermined inter intervals. Further, when a user registers a particular pairing device, e.g., a device that has been accessed by the user, the pairing device's scanning interval can be shortened (e.g., from 2 seconds to 0.5 second). When the user removes or un-pairs a particular pairing device from the user account, the pairing device can be reset to a default setting. The default setting for the pairing device can include scanning only for one or more global shared keys. Once the pairing device is reset, it can become ready to be linked with a nee user account and/or any previously used user accounts.

In some implementations, when a packet exchange flow between the pairing device and the communication device stops unexpectedly and/or response packets are not received within a predetermined time period, the pairing device and/or the communication device can enter a waiting mode during which they await for receipt of the response packet. The waiting period allowed can vary depending on various conditions, such as, the pairing device and/or the communication device's battery level, and/or any other conditions.

In some implementations, the current subject matter's selective-pairing technology can be implemented on additional devices that can be paired with one or more data collecting devices like the pairing devices discussed herein. For example, a beacon can be provided with the selective-pairing technology such that it can operate in the selective-pairing mode ("stealth" mode) and can transmit data only when it receives a valid shared key from a data collection device. The current subject matter can also perform transitions between various modes, including at least one of the following: a beacon mode to/from stealth mode, a standard broadcast mode to/from stealth mode, a beacon mode to/from a stealth mode to/from a standard broadcast mode, etc. The transitions can be performed manually, automatically, based on instructions received from the communication device, etc.

In some implementations, if a pairing device's connection to a network is via a wired connection, it is not necessarily continuous. For example, in some implementations, the pairing device can be connected to a LAN network only when necessary. In some implementations, pairing device can be connected to a computer through USB only when necessary. In these cases, pairing device can send a request to the server to see if there is any shared key updates) or to see if there is anything that needs to be done. The server and pairing device can decide what to do depending upon the communication result between the two devices. In case of continuous connection to the network, the server can initiate a shared key update process or any other necessary tasks because pairing device is ready to communicate with the server all the time.

In some implementations, the current subject matter can provide one or more security levels. For example, in some implementations, a global shared key can be used to register a new pairing device a user account. Once paired with a communication device, the pairing device can be programmed to transmit its MAC address and/or product serial number (e.g., hardware ID) to the communication device, and in turn, to the server. The server can look up the hardware IDs of the pairing device and the communication device, against the registered the pairing devices and the communication devices across the accounts. If the pairing device's hardware ID is new, then the server can generate/assign a new user-specific shared key to the user account. The communication device can receive the new user-specific shared key and transmits it to the pairing device so that the pairing device can activate the user-specific shared key. The pairing device can perform the initial pairing with a global shared key, that is, a global shared key security level can be set to register the pairing device and making user specific key active if the pairing device receives it. This is because global key(s) are likely to be the same across the same make/product type and can be relatively easy to obtain by a third party. In some implementations, if the server can determine that the pairing device's hardware ID is associated with a different account during the registration/initial pairing process, the server can determine the next action(s), including, for example, denying the pairing device's registration to the account that requested it. A global shared key security level can be provided to allow only device registration and user-specific key assignment.

In some implementations, the pairing device's connection based on user-specific key can be allowed to transmit accumulated sensor readings and its conditions, for example, for a communication device to change a mode of the pairing device (e.g. the pairing device can be configured to have multiple modes to be used by multiple users), to modify one or more the pairing device's setting (e.g., sensor type change, etc.), to set the pairing device's state (e.g., set/correct the pairing device's internal real-time clock, etc.), and/or to reset the pairing device (e.g., update global shared key and/or user-specified key) Shared key-based connection can also allow the communication device to reset the pairing device to original factory settings, including, for example, nullifying user specific key(s). In some implementations, the shared key connection can enable more functionality because a user-specific key is less likely to be stolen, and is thus more secure.

In some implementations, if the pairing device is registered to multiple users (e.g., multiple accounts), the pairing device can be allowed to be swapped/switched between or among the accounts. In some implementations, each user can only access his/her data. In some implementations, the security level assignment to each user-specific shared key can be different. For example, some users can be provided with root-level access, while other users are not allowed to change the pairing device's settings. In some implementations, the root user can have access to everyone's sensor readings. In some implementations (for example, when the pairing device is not a healthcare device), each user-specific key's access to each pairing device functions/features can be different.

In some implementations, one or more users can be provided with access to allow/disallow the pairing device remote software update, in whole or in part, from the communication device this case, when the global shared key or user-specific shared key has security level (permission) that allow the pairing device to perform software update, the communication device can send out updated software to the pairing device through BLE. In some implementations, the pairing device can notify the communication device upon completion of the software update. This can provide an additional safeguard against attempt of hacking/tampering of the pairing device.

Although BLE devices have been discussed herein, these are only used as one example of the wireless technology that is prevalent today; other wireless technology (e.g., other wireless communication technology including connectionless wireless communication technology) can be used instead of or in addition to BLE in some implementations to implement one or more selective pairing features discussed herein.

Figure 11:
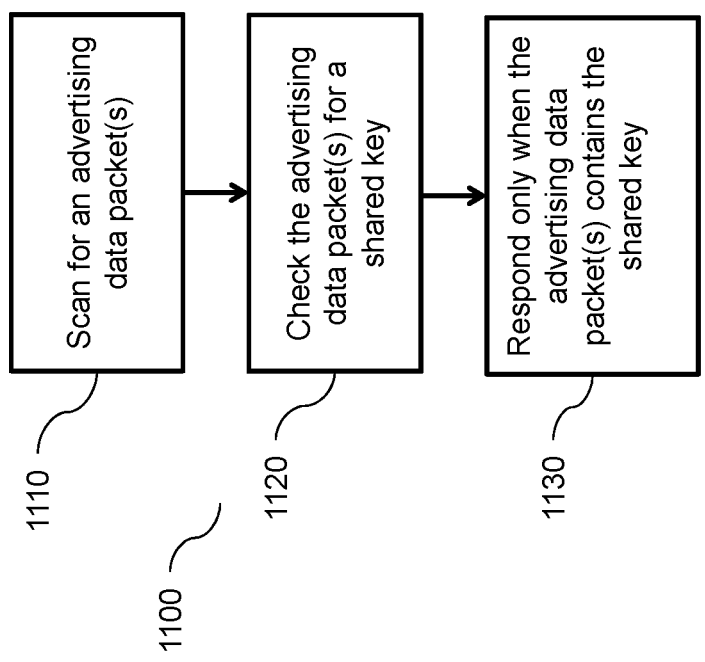
FIG. 11 is a flow chart illustrating an exemplary process for operation of the current subject matter system, according to some implementations of the current subject matter.

FIG. 11 is a flow chart illustrating an exemplary process 1100 for operation of the current subject matter system, according to some implementations of the current subject matter. At 1110, the pairing device can scan for one or more advertising packets. At 1120, the pairing device check the advertising data packet(s) for a shared key, which can be, for example, a global or user-specific shared key. If no shared key is found in the advertising packet(s), the pairing device does not respond. The pairing device can respond only when a shared key is found (e.g., a match with a key that the pairing device is looking for is found) in the advertising packet(s), at 1130. As discussed above, the advertising packet(s) can be transmitted by a communication device via, BLUETOOTH® technology, for example. In some implementations, the shared key can be split up into a plurality of advertising packets, and the pairing device can reconstruct the shared key from the portions in the advertising packets.

In some implementations, the current subject matter can include one or more of the following optional features. In some implementations, the advertising packet can be transmitted by a communication device.

In some implementations, the shared key is in the same bit/byte form between the pairing device and the communication device. In some implementations, the advertising packet can be transmitted via BLUETOOTH® technology. In some implementations, the shared key can be a global shared key or a user-specific shared key associated with a particular user.

In some implementations, the method can also include scanning for a plurality of advertising packets, where each advertising packet in the plurality of advertising packets can contain a portion of the shared key, checking each scanned advertising packet for the respective portion of the shared key, and responding to the plurality of scanned advertising packets only when the entire shared key is found. In some implementations, the method can include authenticating the shared key using a digital certificate.

In some implementations, the responding can further include transmitting at least one of the following: a data attribute, a name, a serial number, a media access control ("MAC") address to the communication device and/or a server. In some implementations, the advertising packet can be encrypted. The advertising packet can include a shared key and a text (e.g., one or more digit of binary data) added to the shared key before the shared key and the added text are encrypted. The added text can be varied for each pairing with the pairing device.

Figure 12:
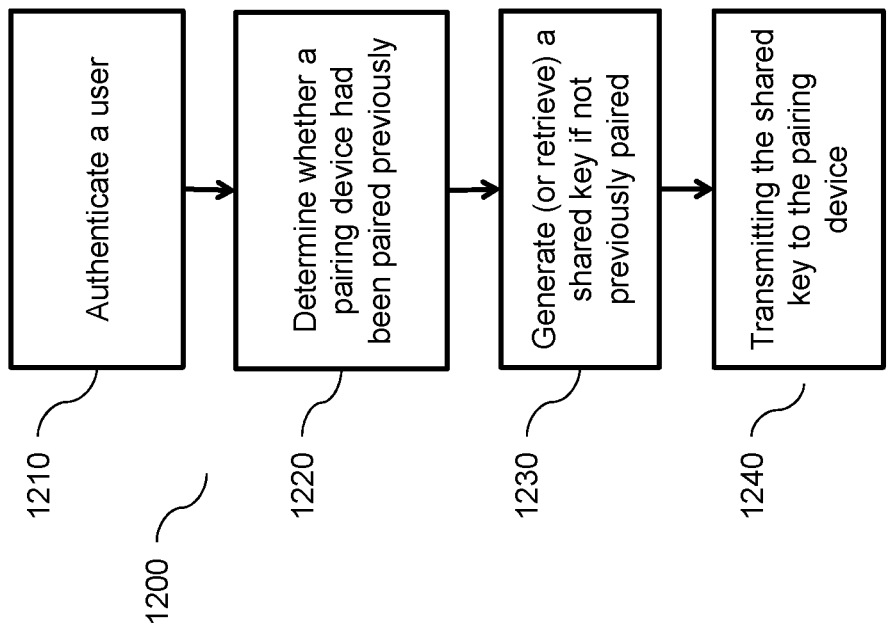
FIG. 12 is a flow chart illustrating an exemplary process 1200 for operation of the current subject matter system, according to some implementations of the current subject matter.

FIG. 12 is a flow chart illustrating an exemplary process 1200 for operation of the current subject ma e stem, according to some implementations of the current subject matter. At 1210, a server can authenticate a user, e.g., via a login process. Once the user is authenticated, the server can determine whether a pairing device, which the user wants to pair, had been previously paired at 1220. If the pairing device had not been paired previously, the server can generate and/or retrieve a shared key, at 1230. The server can transmit the shared key to the paired device, e.g., directly and/or via a communication device, at 1240.

The current subject matter provides many advantages. By providing devices that only respond to advertising packets with one or more shared keys, the device can operate in a selective pairing mode (or "stealth" mode) such that others would not be aware of its presence or existence. This can enhance privacy and achieve lower power consumption. In some implementations, enhanced privacy and/or security can also be provided by utilizing one or more features of the current subject matter. In some implementations, the current subject matter can reduce the number of devices broadcasting in an area. This can, for example, enhance usability and simplify device management. In some implementations, the current subject matter can discourage theft of the devices because the thief would not have access to a shared key that is needed to receive a response from the pairing device.

As discussed above, the current subject matter can also provide different types of shared keys including, for example, global and/or user-specific shared keys. One or more shared keys can be shared with one or more selective pairing devices and/or other communication devices. This way, the typical device pairing process between the communication device and the pairing devices (and/or other communication devices) can be avoided, even if the devices are communicating with each other for the first time.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-serve relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively and/or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or put (e.g., push/touch button, etc.). Other possible input devices include, but are not limited to, touch screens or other touch-sensitive devices such as single or multi-point resistive or capacitive trackpads, voice recognition hardware and software, optical scanners, optical pointers, digital image capture devices and associated interpretation soft and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in pair on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few implementations leave been described in detail above, other modifications or additions are possible. In particular, further features and/or implementations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer-implemented method, comprising:
scanning, by a pairing device, using a shared key, for an advertising packet transmitted from one or more communication devices;
checking, by the pairing device, each scanned advertising packet for the shared key;
responding, by the pairing device, to the scanned advertising packet only when the advertising packet contains the shared key; and
establishing, using the shared key, a connection between the pairing device and the one or more communication devices;
synchronizing, using the one or more communication devices, data transmitted and/or received by the pairing device with one or more servers, the one or more servers storing user account information and the one or more shared keys;
the establishing further comprises establishing one or more-connections between the pairing device and the one or more communication devices upon matching scanned shared key with respective shared keys stored by the pairing device.

2. A computer-implemented method, comprising:
scanning for a shared key in a plurality of shared keys, each shared key in the plurality of shared keys is configured to be shared with and used for establishing one or more connections between one or more pairing devices in a plurality of pairing devices and one or more communication devices in a plurality of communication devices, one or more shared keys in the plurality of shared keys being transmitted by respective one or more communication devices;
checking the scanned shared key by comparing the scanned shared key with a shared key stored by the pairing device;
transmitting a connection request to at least one of the one or more pairing devices and the one or more communication devices upon determination that the scanned shared key matches the stored shared key; and
establishing, based on the determination that the scanned shared key matches the stored shared key, a connection between respective one or more pairing devices and one or more communication devices.

3. The method according to claim 2, wherein the checking further comprises determining at least one of the following: that the scanned shared key is associated with a pairing enabled one or more communication devices, that the scanned shared key is associated with a user account for connecting the pairing device, and the one or more communication devices, and any combination thereof.

4. The method according to claim 2, wherein the comparing further comprises comparing a bit/byte form of the scanned shared key and the stored shared key.

5. The method according to claim 2, wherein the shared key is transmitted using BLUETOOTH® technology.

6. The method according to claim 2, wherein the shared key includes at least one of the following: a global shared key, a user-specific shared key associated with a user, and any combination thereof.

7. The method according to claim 2, further comprising synchronizing, using the one or more communication devices, data transmitted and/or received by the pairing device with one or more servers, the one or more servers storing user account information and the one or more shared keys.

8. The method according to claim 7, wherein the establishing further comprises establishing one or more connections between at least a portion of the plurality of the pairing devices and the one or more communication devices upon matching scanned shared keys with respective shared keys stored by each pairing device in the at least the portion of the plurality of the pairing devices.

9. The method according to claim 2, wherein one or more shared keys are included in one or more advertising packets, wherein the one or more advertising packets include additional data for encryption of the one or more shared keys.

10. The method according to claim 9, wherein each communication device in the one or more communication devices is configured to broadcast a respective advertising packet containing the one or more shared keys.

11. The method according to claim 2, wherein
the connection request is transmitted based on a matching of a scanned global shared key and a stored global shared key; and
the connection is established between the pairing device and the one or more communication devices upon matching of one or more scanned user specific shared keys and the one or more respective stored shared keys.

12. The method according to claim 2, wherein one or more management devices are configured to be communicatively coupled to at least one of the following: one or more pairing devices, one or more communication devices, a server, and any combination thereof.

13. The method according to claim 2, wherein the one or more pairing devices includes at least one of the following: a medical device, a non-medical device, a sensor device, a monitoring device, a metering device, an access device, a locking device, and any combination thereof.

14. A system comprising:
at least one programmable processor; and
a non-transitory machine-readable medium storing instructions that, when executed by the at least one programmable processor, cause the at least one programmable processor to perform operations comprising:
scanning for a shared key in a plurality of shared keys, each shared key in the plurality of shared keys is configured to be shared with and used for establishing one or more connections between one or more pairing devices in a plurality of pairing devices and one or more communication devices in a plurality of communication devices, one or more shared keys in the plurality of shared keys being transmitted by respective one or more communication devices;
checking the scanned shared key by comparing the scanned shared key with a shared key stored by the pairing device;
transmitting a connection request to at least one of the one or more pairing devices and the one or more communication devices upon determination that the scanned shared key matches the stored shared key; and establishing, based on the determination that the scanned shared key matches the stored shared key, a connection between respective one or more pairing devices and one or more communication devices.

15. The system according to claim 14, wherein the checking further comprises determining at least one of the following: that the scanned shared key is associated with a pairing enabled one or more communication devices, that the scanned shared key is associated with a user account for connecting the pairing device, and the one or more communication devices, and any combination thereof.

16. The system according to claim 14, wherein the comparing further comprises comparing a bit/byte form of the scanned shared key and the stored shared key.

17. The system according to claim 14, wherein the shared key is transmitted using BLUETOOTH® technology.

18. The system according to claim 14, wherein the shared key includes at least one of the following: a global shared key, a user-specific shared key associated with a user, and any combination thereof.

19. The system according to claim 14, wherein the operations further comprise
synchronizing, using the one or more communication devices, data transmitted and/or received by the pairing device with one or more servers, the one or more servers storing user account information and the one or more shared keys.

20. The system according to claim 19, wherein the establishing further comprises establishing one or more connections between at least a portion of the plurality of the pairing devices and the one or more communication devices upon matching scanned shared keys with respective shared keys stored by each pairing device in the at least the portion of the plurality of the pairing devices.

21. The system according to claim 14, wherein one or more shared keys are included in one or more advertising packets, wherein the one or more advertising packets include additional data for encryption of the one or more shared keys.

22. The system according to claim 21, wherein each communication device in the one or more communication devices is configured to broadcast a respective advertising packet containing the one or more shared keys.

23. The system according to claim 14, wherein
the connection request is transmitted based on a matching of a scanned global shared key and a stored global shared key; and
the connection is established between the pairing device and the one or more communication devices upon matching of one or more scanned user specific shared keys and the one or more respective stored shared keys.

24. The system according to claim 14, wherein one or more management devices are configured to be communicatively coupled to at least one of the following: one or more pairing devices, one or more communication devices, a server, and any combination thereof.

25. The system according to claim 14, wherein the one or more pairing devices includes at least one of the following: a medical device, a non-medical device, a sensor device, a monitoring device, a metering device, an access device, a locking device, and any combination thereof.

26. A computer program product comprising a non-transitory machine-readable medium storing instructions that, when executed by at least one programmable processor, cause the at least one programmable processor to perform operations comprising:
scanning for a shared key in a plurality of shared keys, each shared key in the plurality of shared keys is configured to be shared with and used for establishing one or more connections between one or more pairing devices in a plurality of pairing devices and one or more communication devices in a plurality of communication devices, one or more shared keys in the plurality of shared keys being transmitted by respective one or more communication devices;
checking the scanned shared key by comparing the scanned shared key with a shared key stored by the pairing device;
transmitting a connection request to at least one of the one or more pairing devices and the one or more communication devices upon determination that the scanned shared key matches the stored shared key; and
establishing, based on the determination that the scanned shared key matches the stored shared key, a connection between respective one or more pairing devices and one or more communication devices.

27. The computer program product according to claim 26, wherein the checking further comprises determining at least one of the following: that the scanned shared key is associated with a pairing enabled one or more communication devices, that the scanned shared key is associated with a user account for connecting the pairing device, and the one or more communication devices, and any combination thereof.

28. The computer program product according to claim 26, wherein the comparing further comprises comparing a bit/byte form of the scanned shared key and the stored shared key.

29. The computer program product according to claim 26, wherein the shared key is transmitted using BLUETOOTH® technology.

30. The computer program product according to claim 26, wherein the shared key includes at least one of the following: a global shared key, a user-specific shared key associated with a user, and any combination thereof.

31. The computer program product according to claim 26, wherein the operations further comprise
synchronizing, using the one or more communication devices, data transmitted and/or received by the pairing device with one or more servers, the one or more servers storing user account information and the one or more shared keys.

32. The computer program product according to claim 31, wherein the establishing further comprises establishing one or more connections between at least a portion of the plurality of the pairing devices and the one or more communication devices upon matching scanned shared keys with respective shared keys stored by each pairing device in the at least the portion of the plurality of the pairing devices.

33. The computer program product according to claim 26, wherein one or more shared keys are included in one or more advertising packets, wherein the one or more advertising packets include additional data for encryption of the one or more shared keys.

34. The computer program product according to claim 33, wherein each communication device in the one or more communication devices is configured to broadcast a respective advertising packet containing the one or more shared keys.

35. The computer program product according to claim 26, wherein
the connection request is transmitted based on a matching of a scanned global shared key and a stored global shared key; and the connection is established between the pairing device and the one or more communication devices upon matching of one or more scanned user specific shared keys and the one or more respective stored shared keys.

36. The computer program product according to claim 26, wherein one or more management devices are configured to be communicatively coupled to at least one of the following: one or more pairing devices, one or more communication devices, a server, and any combination thereof.

37. The computer program product according to claim 26, wherein the one or more pairing devices includes at least one of the following: a medical device, a non-medical device, a sensor device, a monitoring device, a metering device, an access device, a locking device, and any combination thereof.

38. A computer-implemented method, comprising:
scanning, by a pairing device, using a shared key, for an advertising packet transmitted from a communication device;
checking, by the pairing device, each scanned advertising packet for the shared key;
responding, by the pairing device, to the scanned advertising packet only when the advertising packet contains the shared key; and
establishing, using the shared key, a connection between the pairing device and the communication device;
wherein each advertising packet advertised by the communication device includes a payload containing a shared key, in a plurality of shared keys, disposed in different addresses in the payload for each advertising by the communication device, the plurality of shared keys includes the shared key.

\* \* \* \* \*